Aug. 5, 1958  O. V. INGRUBER  2,846,386
REFERENCE ELECTRODE FOR MAKING pH MEASUREMENTS
Filed June 22, 1953
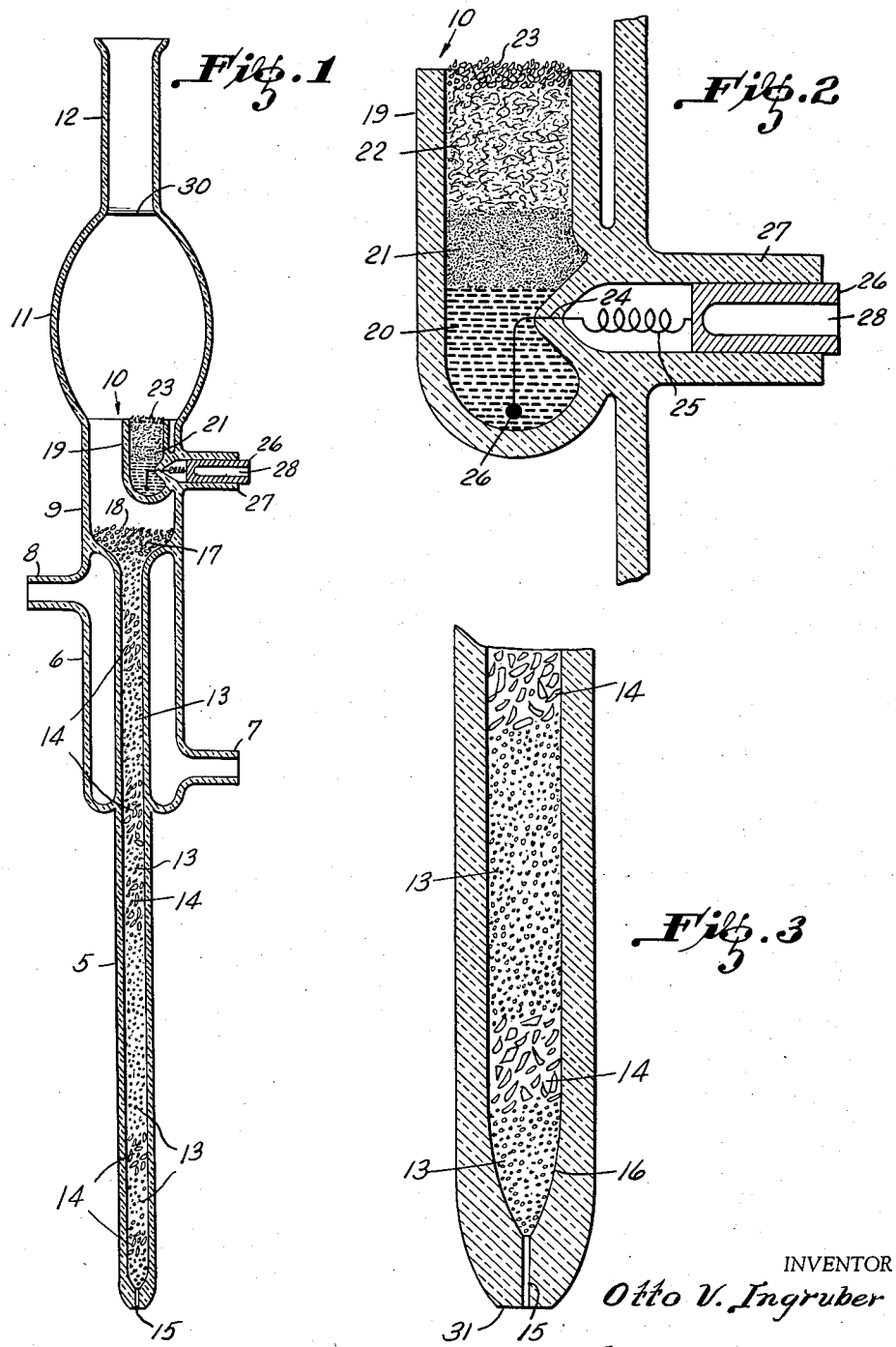
INVENTOR
Otto V. Ingruber
BY James D. Bock
ATTORNEY

United States Patent Office 2,846,386
Patented Aug. 5, 1958

2,846,386

REFERENCE ELECTRODE FOR MAKING pH MEASUREMENTS

Otto V. Ingruber, Montreal, Quebec, Canada, assignor, by mesne assignments, to Canadian Aviation Electronics Limited, St. Laurent, Quebec, Canada Application June 22, 1953, Serial No. 363,359

9 Claims. (Cl. 204—195)

This invention relates to improvements in reference electrodes used in measuring the concentration of hydrogen ions in solutions.

More particularly, the invention provides a reference electrode designed to give satisfactorily reproducible results when used for measuring the pH of solutions which are under high temperatures and high pressures such, for example, as temperatures substantially above 160° C. and pressures substantially above 120 lbs. p. s. i. The invention also provides a reference electrode which, when used under conditions of high temperature and high pressure, adapts itself to changes in temperature with sufficient rapidity to substantially eliminate hysteresis effects.

In measuring the pH or hydrogen ion concentration of solutions it is common practice to employ a measuring assembly in which a glass electrode and a pH meter are used in connection with a reference electrode having a stable, reproducible, standard potential. The reference electrodes now available for this purpose are quite satisfactory for making pH measurements at room temperature or at any constant temperature up to about 80° C. They do not, however, function efficiently or give accurately reproducible results when used for making pH measurements at high temperatures and this is especially true when the measurements must be made under conditions where the reference electrode is exposed to high pressure. Available reference electrodes which are recommended for use under high pressure and high temperature, up to the limits of 130° C. and 30 p. s. i., are also characterized by slow adaptation to temperature changes resulting in undesirable hysteresis effects.

The improved reference electrode provided in accordance with the present invention is of the calomel half-cell type and is adapted to function efficiently under conditions of high temperature and high pressure by reason of the fact that (a) the calomel half-cell may be maintained at room temperature during pH measuring operations; (b) the temperature gradient of the electrode is confined to the electrolyte which is contained in the stem portion of the electrode and which makes contact or liquid junction with the hot solution being measured; (c) movement of the electrolyte in the stem of the electrode, due to convection, is reduced to a minimum to avoid fluctuations of electrode potential and to extend the serviceable life of the electrode; and (d) the volume of the electrolyte exposed to the temperature gradient is kept small enough to enable the electrode to adapt itself to changes in temperature with sufficient rapidity to avoid hysteresis effects.

The invention will now be described in greater detail with reference to the preferred embodiment shown in the accompanying drawings, in which—

Fig. 1 is a longitudinal sectional view of the improved reference electrode.

Fig. 2 is an enlarged sectional view of the calomel half-cell forming part of the electrode assembly shown in Fig. 1, and Fig. 3 is an enlarged sectional view of the lower end of the electrode stem, showing the filling of the stem and the capillary opening at which contact or liquid junction is made with the solution being measured.

As shown in these drawings, my invention is embodied in a reference electrode of the calomel cell type including a stem 5 having its upper portion surrounded by a cooling jacket 6 provided with cooling medium inlet and outlet connections indicated, respectively, at 7 and 8. The upper end of stem 5 is flared outwardly and fused to the lower end of a glass body section 9 containing a calomel half-cell 10. The body section 9 includes a large bulb portion 11 and a connecting tube 12.

Stem 5 contains a liquid electrolyte consisting of saturated potassium chloride (KCl). It also contains batches or layers 13 of potassium chloride crystals alternating with batches or layers 14 of insoluble material such as splinters of thin crushed glass, glass beads, or asbestos. The lower end of stem 5 is pierced by a very fine capillary hole or opening 15 toward which the lower portion of the bore of the stem is tapered as indicated at 16. The upper end of stem 5 is plugged by fibrous material 17 consisting, preferably, of clean cellulose fibres on top of which a small amount of potassium chloride crystals are distributed as indicated at 18 to maintain saturation. During filling thereof the stem 5 may be heated to and maintained at a temperature close to boiling temperature in order to keep the stem close to the conditions of high temperature at which it will operate. It is also advisable to strike the stem several times during the filling thereof in order to compact the contents.

The half-cell 10 used in my electrode comprises a small open-top receptacle 19 containing, in the lower portion thereof, a suitable amount of clean mercury 20 on top of which is spread a suitable amount of calomel 21 in the form of a paste or a dry mixture. The top or open end of receptacle 19 is plugged by fibrous material 22 consisting, preferably, of clean cellulose fibres on top of which a small amount of potassium chloride crystals are distributed as indicated at 23 to maintain saturation. Receptacle 19 is sealed to the inner side of body section 9 and is provided with a side opening 24 in which an intermediate portion of a platinum wire 25 is sealed with a ball pointed end immersed in the mercury 20 and bent downwardly toward the bottom of the receptacle 17. The other end of said wire is soldered or otherwise electrically connected to a copper terminal 26 cemented in place within a glass tube 27 which is sealed to the body section 9. The copper terminal 26 is provided with a small bore 28 in which a pin terminal of a conductor may be inserted in connecting the electrode in circuit with a pH meter and a glass electrode in conventional manner to provide a complete assembly for hydrogen ion measurements.

After the filling and plugging of cell 10 and stem 5 the body section 9, which serves as an electrolyte reservoir, is filled with saturated potassium chloride solution up to the level indicated at 30 in Fig. 1. Pressure is then applied to the electrolyte in body section 9 by connecting tube 12 to a cylinder (not shown) containing compressed nitrogen and equipped with a pressure reducing gauge through which the tube is connected to said cylinder.

The stem 5, the water jacket 6, the body section 9 and the calomel cell receptacle 19 are preferably made of Pyrex glass.

In making pH measurements, the reference electrode together with a glass electrode and a temperature measuring device are tightly clamped to the cover of a common flow chamber so that contact is made, within said chamber, with the liquid or solution to be measured. The stem of the reference electrode need not be deeply immersed in the liquid being measured since contact through the liquid junction afforded by the opening 15 at the lower end of the stem is all that is necessary. However, it has been found preferable to mount the reference electrode so that the stem 5 dips into the solution being measured to a certain depth since, otherwise, the stability of the readings may be affected by the inhomogeneity which exists at the surface regions of a highly heated liquid (dynamic equilibrium of the gas and liquid, gas bubbles, froth).

The overall electrical resistance of the reference electrode is determined mainly by the resistance in the capillary opening 15 through which the saturated potassium chloride solution in stem 5 makes contact or liquid junction with the liquid being measured. This overall electrical resistance of the reference electrode may therefore be conveniently brought to a desired value by grinding the bottom surface 31 of stem 5 to thereby reduce the length of opening 15. In practice it has been found that if the electrical resistance of the reference electrode is maintained at a value of about 50,000 ohms, the loss of electrolyte through capillary opening 15 is very small. No difficulties in pH meter readings due to electro-static charges are encountered if shielding is adequate, since the resistance of the reference electrode is only one of the additive factors, and a relatively unimportant one, of the resistance in a pH measuring circuit.

When the body section 9 of the reference electrode is filled with saturated potassium chloride solution up to the level 30 the electrode will need no replenishing of KCl solution for at least 24 hours even if a pressure differential as high as 40 p. s. i. is maintained over the whole period. If a pressure differential of up to 5 p. s. i. is maintained automatically under all working conditions, the electrode can be used for periods up to two weeks without any attention. Under constant pressure, no plugging of the liquid junction can occur if the solution and particles used for filling are clean.

The provision of layers or batches of insoluble material between the layers or batches of potassium chloride crystals contained in stem 5 of the reference electrode is important to satisfactory functioning of the electrode when used for making pH measurements under high temperature working conditions. This will be clear from the following explanation.

If the stem 5 is filled only with potassium chloride solution, saturated at room temperature, and the reference electrode is then used in making pH measurements under high temperature conditions the following difficulties are encountered:

(a) Strong fluctuations of pH meter readings (of $\geq 0.05$ pH units) are caused by convection inside the stem 5 to which the temperature gradient is confined by the effect of the cooling jacket 6 through which water or other cooling medium is circulated when the electrode is in use. Cold solution moves down from the cooled portion of the stem and hot solution moves upwardly causing changes in concentration with resulting fluctuations of the electrode potential. Steam bubbles moving upwardly in the stem may also cause fluctuations of the electrode potential by temporarily greatly increasing the electrical resistance of the electrode.

(b) Deposit of an increasing amount of potassium chloride crystals in the cooled portions of stem 5 indicates that salt migrates from the hot to the cold portions of the stem leaving the solution in the hot portions of the stem increasingly unsaturated. In these circumstances, and bearing in mind the fact that the liquid junction potential (which is one of the additive factors of the electrode potential) depends on the concentration it will be apparent that the electrode will not have a stable, reproducible, standard potential and cannot be used repeatedly.

If the stem 5 of the reference electrode is filled only with potassium chloride crystals and solution, the fluctuations of the electrode potential will be greatly reduced but slow migration of potassium chloride will still take place within the stem and cause undesirable fluctuations of electrode potential and pH readings.

When the layers or batches of crystals contained in the electrode stem 5 are separated by layers or batches of insoluble material, as provided for by the present invention, the movement of liquid in the stem is reduced to a minimum and all the different saturation equilibria which develop along the temperature gradient are controlled to give a condition of almost static transition which effectively eliminates undesirable fluctuations of electrode potential. It will thus be evident that, in the improved reference electrode provided by the present invention, the electrolyte in the stem is closely confined to its true function which is that of an electrical conductor.

The fibre plug 17 at the upper end of electrode stem 5 serves, in conjunction with the passage of water or other cooling medium through cooling jacket 6, to confine the entire temperature gradient of the electrode to the electrolyte contained in said stem so that the remaining portions of the electrode, comprising body section 9 and calomel half-cell 10, may be kept at a constant temperature, such as room temperature. In this connection it will be understood that, when the reference electrode is used for measuring the pH of solutions maintained at high temperatures and under high pressures in a pressure vessel, the reference electrode is arranged so that only the stem 5 extends into the vessel, leaving the body section 9 and the calomel half-cell 10 outside the vessel so that these latter parts may easily be maintained at room temperature or other constant temperature by controlled flow of cooling medium through cooling jacket 6.

It is desirable that the temperature of the calomel cell 10 be maintained at a constant temperature within $\pm 2°$ C. and this may be accomplished by controlling the rate of flow of cold water or other cooling medium through cooling jacket 6. This control of the rate of flow of the cooling medium through jacket 6 may be accomplished through the agency of any suitable adjustable manual flow control means or through the agency of automatically operating control means in combination with a temperature measuring device.

The volume of the saturated potassium chloride solution present between the crystals in stem 5 must be kept small enough to eliminate lag in the adaptation of the electrode to changes in temperature. When this requirement is met a constant electrode potential (i. e. a constant pH reading) is obtained as soon as the temperature of the solution being measured is kept constant. The volume of the electrode stem exposed to changing temperatures is also a factor in eliminating lag in the adaptation of the electrode to changing temperatures and should therefore be as small as possible consistent with the provision of an electrode having sufficient structural strength for practical purposes.

It is well known that the liquid junction potential of a reference electrode depends on the concentration and/or composition of the electrolyte since ion concentrations and ion mobilities are the factors responsible for the transfer of electricity. On the other hand, the liquid junction potential does not appear to be affected by pressure differentials between the electrolyte and the solution being measured. In this connection it has been observed that, even with pressure differentials up to 100 lbs. p. s. i. between the electrolye and the solution being measured, there was no measureable change of the electrode potential. It therefore appears that different flow rates of electrolyte through the liquid junction do not change the potential of the electrode or that flow rates do not change to any considerable degree within the said pressure differential range because the capillary opening 15 through which the liquid junction is made is too fine. To confirm this the overall resistance of several electrodes was measured under pressures varying from 0 to 80 p. s. i. and no change of resistance was apparent.

In order to obtain the best results the electrode stem 5 should be filled with the alternately arranged batches of potassium chloride crystals and insoluble material in such manner that the ratio of crystals to insoluble matter is greater in the lower than in the upper portion of the stem. Since at higher temperatures more salt is necessary to make up a saturated KCl solution, it is advisable to have a higher ratio of KCl crystals to insoluble material in the lower part of the stem. In the upper portion of the stem, the temperature is reduced by the action of the cooling jacket, and thus in this region the insoluble material may predominate, or even be used to the exclusion of solid KCl. There should, however, be a larger amount of solid KCl present in the part of the electrode where the temperature gradient occurs, i. e. between the part of the stem which is covered by the cooling jacket and a point where the lower end is fully immersed in the hot liquid. When the electrode is in operation, the electrolyte flows from the colder portion of the stem through increasingly heated regions, and in order to remain saturated at the higher temperatures, leaches out solid KCl, which cannot be replaced without emptying, cleaning and refilling the whole electrode. For the same reason, namely to keep the electrode in good serviceable condition for an extended period of time, the flow rate of the electrolyte is kept very small.

Because of its ability to quickly adapt itself to changing temperature without hysteresis effects and to give a stable, reproducible, potential when used under conditions of high temperature and pressure, the reference electrode provided in accordance with this invention is particularly suitable for use in measuring the pH of the pulp cooking liquor in a sulphite or other pulp digester during the cooking cycle.

The electrode provided by the present invention can be used under conditions of temperature and pressure which are limited only by the physical strength of the construction.

Having thus described the nature of my invention and a preferred embodiment thereof, it will be understood that various modifications may be resorted to within the scope and spirit of the invention as defined by the appended claims.

The embodiments of the invention in which an exclusive property or privilege is claimed are defined as follows:

1. A reference electrode for use in making pH measurements on bodies of test liquids at temperatures substantially above normal atmospheric temperatures, comprising an elongated hollow electrode stem containing an electrolyte and having in one end portion thereof means for providing a liquid junction between said electrolyte and a test liquid when said end portion of said stem is immersed in said test liquid, said electrode stem having an intermediate portion next adjacent to said end portion and a remote portion on the side of said intermediate portion away from said end portion, said electrode stem being adapted to be immersed in said test liquid with said end portion extending into said test liquid whereby the electrolyte in said end portion will assume substantially the temperature of said body of test liquid, said remote portion containing electrolyte in communication with the electrolyte in said end portion of said stem, means for cooling the electrolyte in the intermediate portion of said stem to limit heat exchange between the electrolyte in the end portion and the electrolyte in the remote portion of said stem whereby the electrolyte in said remote portion of said stem is maintained at a temperature substantially below that of said body of test liquid, said electrolyte comprising a saturated solution, and said stem having therein batches of crystals of the solute of said electrolyte and masses of porous material which is solid and inert in said electrolyte at any concentration thereof and at temperatures at least up to 160° C., said batches of crystals and said masses of porous material being alternately arranged in said end and intermediate portions of said stem.

2. A reference electrode for use in making pH measurements on bodies of test liquids at temperatures substantially above normal atmospheric temperatures, comprising an elongated hollow electrode stem containing an electrolyte and having in one end portion thereof means for providing a liquid junction between said electrolyte and a test liquid when said end portion of said stem is immersed in said test liquid, said electrode stem having an intermediate portion next adjacent to said end portion and a remote portion on the side of said intermediate portion away from said end portion, said electrode stem being adapted to be immersed in said test liquid with said end portion extending into said test liquid whereby the electrolyte in said end portion will assume substantially the temperature of said body of test liquid, said remote portion containing electrolyte in communication with the electrolyte in said end portion of said stem, means for cooling the electrolyte in the intermediate portion of said stem to limit heat exchange between the electrolyte in the end portion and the electrolyte in the remote portion of said stem whereby the electrolyte in said remote portion of said stem is maintained at a temperature substantially below that of said body of test liquid, said electrolyte comprising a saturated solution of potassium chloride and said stem having batches of potassium chloride crystals and batches of glass particles alternately arranged in said end and intermediate portions thereof.

3. A reference electrode for use in making pH measurements on bodies of test liquids at temperatures substantially above normal atmospheric temperatures, comprising an elongated hollow electrode stem containing an electrolyte and having in one end portion thereof means for providing a liquid junction between said electrolyte and a test liquid when said end portion of said stem is immersed in said test liquid, said electrode stem having an intermediate portion next adjacent to said end portion and a remote portion on the side of said intermediate portion away from said end portion, said electrode stem being adapted to be immersed in said test liquid with said end portion extending into said test liquid whereby the electrolyte in said end portion will assume substantially the temperature of said body of test liquid, said remote portion containing electrolyte in communication with the electrolyte in said end portion of said stem, means for cooling the electrolyte in the intermediate portion of said stem to limit heat exchange between the electrolyte in the end portion and the electrolyte in the remote portion of said stem whereby the electrolyte in said remote portion of said stem is maintained at a temperature substantially below that of said body of test liquid, said electrolyte comprising a saturated solution of potassium chloride, and said stem having batches of potassium chloride crystals and batches of glass particles alternately arranged in said end and intermediate portions thereof, the ratio of potassium chloride crystals to glass particles being greater in the end portion of said stem than the intermediate portion thereof.

4. A reference electrode for use in making pH measurements on bodies of test liquids at temperatures and pressures substantially above normal atmospheric temperatures and pressures, comprising an elongated hollow electrode stem containing an electrolyte and having in one end portion thereof a small opening for providing a liquid junction between said electrolyte and a test liquid when said end portion of said stem is immersed in said test liquid, said electrode stem having an intermediate portion next adjacent to said end portion and a remote portion on the side of said intermediate portion away from said end portion, said electrode stem being adapted to be immersed in said test liquid with said end portion extending into said test liquid whereby the electrolyte in said end portion will assume substantially the temperature of said body of test liquid, said remote portion containing electrolyte in communication with the electrolyte in said end portion of said stem, means for cooling the electrolyte in the intermediate portion of said stem to limit heat exchange between the electrolyte in the end portion and the electrolyte in the remote portion of said stem whereby the electrolyte in said remote portion of said stem is maintained at a temperature substantially below that of said body of test liquid, means for maintaining hydrostatic pressure upon said electrolyte at least slightly greater than the hydrostatic pressure upon said test liquid at a point coinciding with said small opening whereby to cause constant seepage of electrolyte from said small opening, said electrolyte comprising a saturated solution, and said stem having therein batches of crystals of the solute of said electrolyte and masses of porous material which is solid and inert in said electrolyte at any concentration thereof and at temperatures at least up to 160° C., said batches of crystals and said masses of porous material being alternately arranged in said end and intermediate portions of said stem.

5. A reference electrode for use in making pH measurements on bodies of test liquids at temperatures and pressures substantially above normal atmospheric temperatures and pressures, comprising an elongated hollow electrode stem containing an electrolyte and having in one end portion thereof a small opening for providing a liquid junction between said electrolyte and a test liquid when said end portion of said stem is immersed in said test liquid, said electrode stem having an intermediate portion next adjacent to said end portion and a remote portion on the side of said intermediate portion away from said end portion, said electrode stem being adapted to be immersed in said test liquid with said end portion extending into said test liquid whereby the electrolyte in said end portion will assume sustantially the temperature of said body of test liquid, said remote portion containing electrolyte in communication with the electrolyte in said end portion of said stem, means for cooling the electrolyte in the intermediate portion of said stem to limit heat exchange between the electrolyte in the end portion and the electrolyte in the remote portion of said stem whereby the electrolyte in said remote portion of said stem is maintained at a temperature substantially below that of said body of test liquid, means for maintaining hydrostatic pressure upon said electrolyte at least slightly greater than the hydrostatic pressure upon said test liquid at a point coinciding with said small opening whereby to cause constant seepage of electrolyte from said small opening, said electrolyte comprising a saturated solution of potassium chloride, and said stem having batches of potassium chloride crystals and batches of glass particles alternately arranged in said end and intermediate portions thereof.

6. A reference electrode for use in making pH measurements on bodies of test liquids at temperatures and pressures substantially above normal atmospheric temperatures and pressures, comprising an elongated hollow electrode stem containing an electrolyte and having in one end portion thereof a small opening for providing a liquid junction between said electrolyte and a test liquid when said end portion of said stem is immersed in said test liquid, said electrode stem having an intermediate portion next adjacent to said end portion and a remote portion on the side of said intermedaite portion away from said end portion, said electrode stem being adapted to be immersed in said test liquid with said end portion extending into said test liquid whereby the electrolyte in said end portion will assume substantially the temperature of said body of test liquid, said remote portion containing electrolyte in communication with the electrolyte in said end portion of said stem, means for cooling the electrolyte in the intermediate portion of said stem to limit heat exchange between the electrolyte in the end portion and the electrolyte in the remote portion of said stem wherey the electrolyte in said remote portion of said stem is maintained at a temperature substantially below that of said body of test liquid, means for maintaining hydrostatic pressure upon said electrolyte at least slightly greater than the hydrostatic pressure upon said test liquid at a point coinciding with said small opening whereby to cause constant seepage of electrolyte from said small opening, said electrolyte comprising a saturated solution of potassium chloride, and said stem having batches of potassium chloride crystals and batches of glass particles alternately arranged in said end and intermediate portions thereof, the ratio of potassium chloride crystals to glass particles being greater in the end portion of said stem than in the intermediate portion thereof.

7. A reference electrode for use in making pH measurements on a test liquid within a pressure vessel under hydrostatic pressures and temperatures substantially above normal atmospheric pressures and temperatures comprising an electrode stem containing an electrolyte and having a small opening for providing a liquid junction between said electrolyte and a test liquid in which said electrode stem is immersed, a reservoir of substantial depth having a supply of electrolyte communicating with the electrolyte in said electrode stem, a half-cell positioned in said reservoir, means for electrolytically connecting said half-cell with the electrolyte contained in said reservoir, said electrolytically connecting means being located adjacent the bottom of said reservoir whereby when said reservoir is filled a substantial depth of the electrolyte therein will lie above said electrolytically connecting means, means for connecting said reservoir with a source of gas inert to said electrolyte and under pressure to maintain hydrostatic pressure upon said electrolyte in said reservoir and said stem wholly independent of and at least slightly greater than the hydrostatic pressure upon said test liquid at a point coinciding with said small opening whereby to cause a constant seepage of electrolyte from said small opening, the substantial depth of electrolyte in said reservoir when filled providing for extended periods of use of said reference electrode before refilling of said reservoir becomes necessary, means for cooling the electrolyte in said reservoir, said electrolyte in said stem and reservoir comprising a saturated solution, and said stem having therein batches of crystals of the solute of said electrolyte and masses of porous material which is solid and inert in said electrolyte at any concentration thereof and at temperatures at least up to 160° C., said batches of crystals and said masses of porous material being alternately arranged in said stem from said small opening to the bottom of said reservoir.

8. A reference electrode for use in making pH measurements on a test liquid within a pressure vessel under hydrostatic pressures and temperatures substantially above normal atmospheric pressures and temperatures comprising an electrode stem containing an electrolyte and having a small opening for providing a liquid junction between said electrolyte and a test liquid in which said electrode stem is immersed, a reservoir of substantial depth having a supply of electrolyte communicating with the electrolyte in said electrode stem, a half-cell positioned in said reservoir, means for electrolytically connecting said half-cell with the electrolyte contained in said reservoir, said electrolytically connecting means being located adjacent the bottom of said reservoir whereby when said reservoir is filled a substantial depth of the electrolyte therein will lie above said electrolytically connecting means, means for connecting said reservoir with a source of gas inert to said electrolyte and under pressure to maintain hydrostatic pressure upon said electrolyte in said reservoir and said stem wholly independent of and at least slightly greater than the hydrostatic pressure upon said test liquid at a point coinciding with said small opening whereby to cause a constant seepage of electrolyte from said small opening, the substantial depth of electrolyte in said reservoir when filled providing for extended periods of use of said reference electrode before refilling of said reservoir becomes necessary, means for cooling the electrolyte in said reservoir, said electrolyte in said stem and reservoir comprising a saturated solution of potassium chloride and said stem having batches of potassium chloride crystals and batches of glass particles alternately arranged in said stem from said small opening to the bottom of said reservoir.

9. A reference electrode for use in making pH measurements on a test liquid within a pressure vessel under hydrostatic pressures and temperatures substantially above normal atmospheric pressures and temperatures comprising an electrode stem containing an electrolyte and having a small opening for providing a liquid junction between said electrolyte and a test liquid in which said electrode stem is immersed, a reservoir of substantial depth having a supply of electrolyte communicating with the electrolyte in said electrode stem, a half-cell positioned in said reservoir, means for electrolytically connecting said half-cell with the electrolyte contained in said reservoir, said electrolytically connecting means being located adjacent the bottom of said reservoir whereby when said reservoir is filled a substantial depth of the electrolyte therein will lie above said electrolytically connecting means, means for connecting said reservoir with a source of gas inert to said electrolyte and under pressure to maintain hydrostatic pressure upon said electrolyte in said reservoir and said stem wholly independent of and at least slightly greater than the hydrostatic pressure upon said test liquid at a point coinciding with said small opening whereby to cause a constant seepage of electrolyte from said small opening, the substantial depth of electrolyte in said reservoir when filled providing for extended periods of use of said reference electrode before refilling of said reservoir becomes necessary, means for cooling the electrolyte in said reservoir, said electrolyte in said stem and reservoir comprising a saturated solution of potassium chloride, and said stem having batches of potassium chloride crystals and batches of glass particles alternately arranged in said stem from said small opening to the bottom of said reservoir, the ratio of potassium chloride crystals to glass particles being greater in the portion adjacent said small opening than in the portion adjacent the bottom of said reservoir.

References Cited in the file of this patent

UNITED STATES PATENTS

| 2,697,070 | Arthur | Dec. 14, 1954 |

FOREIGN PATENTS

| 662,802 | Great Britain | Dec. 12, 1951 |
| 678,648 | Great Britain | Sept. 3, 1952 |